US010609235B2

(12) United States Patent
Shiokawa et al.

(10) Patent No.: US 10,609,235 B2
(45) Date of Patent: Mar. 31, 2020

(54) IMAGE FORMING APPARATUS FOR DOUBLE-SIDED CONVEYANCE

(71) Applicant: KONICA MINOLTA, INC., Chiyoda-ku, Tokyo (JP)

(72) Inventors: Yasuo Shiokawa, Tokyo (JP); Yoshiteru Kawakami, Tokyo (JP); Takahiro Okubo, Kanagawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 16/005,838

(22) Filed: Jun. 12, 2018

(65) Prior Publication Data
US 2018/0367687 A1   Dec. 20, 2018

(30) Foreign Application Priority Data

Jun. 15, 2017 (JP) ................................ 2017-117836
Jul. 5, 2017 (JP) ................................ 2017-132167
May 24, 2018 (JP) ................................ 2018-099410

(51) Int. Cl.
*H04N 1/00* (2006.01)
*G03G 15/20* (2006.01)
(Continued)

(52) U.S. Cl.
CPC ....... *H04N 1/00572* (2013.01); *G03G 15/165* (2013.01); *G03G 15/2028* (2013.01); *G03G 15/2053* (2013.01); *G03G 15/234* (2013.01)

(58) Field of Classification Search
CPC ............. H04N 1/00572; G03G 15/165; G03G 15/2028; G03G 15/2053; G03G 15/234
See application file for complete search history.

(56) References Cited

U.S. PATENT DOCUMENTS

2009/0059313 A1*  3/2009  Tseng .................... B65H 5/062
                                                        358/474
2016/0176677 A1*  6/2016  Mizuguchi ............. B65H 85/00
                                                        271/3.19
(Continued)

FOREIGN PATENT DOCUMENTS

JP        2006-124100 A    5/2006
JP        2006-298605 A    11/2006

OTHER PUBLICATIONS

Extended European Search Report dated Nov. 15, 2018, issued by the European Patent Office in corresponding European Application No. 18177721.0. (8 pages).

*Primary Examiner* — Iriana Cruz
(74) *Attorney, Agent, or Firm* — Buchanan Ingersoll & Rooney PC

(57) ABSTRACT

An image forming apparatus includes an image former forming a toner image on a long sheet; a main conveyance path conveying the long sheet to the image former; and a double-side conveyance path which branches off from a first side, in the main conveyance path, downstream of the image former in a conveyance direction of the long sheet, and which conveys the long sheet to a second side upstream of the image former by reversing the conveyance direction at a point of switching back to invert the long sheet. The double-side conveyance path includes, in a downstream side in the conveyance direction before the switching back, a merging pathway connected to the second side upstream of the image former in the main conveyance path, and a first introducer introducing into the merging pathway a head of the long sheet in the conveyance direction before the switching back.

9 Claims, 8 Drawing Sheets

(51) Int. Cl.
*G03G 15/16* (2006.01)
*G03G 15/23* (2006.01)

(56) References Cited

U.S. PATENT DOCUMENTS

| | | | |
|---|---|---|---|
| 2018/0088521 A1* | 3/2018 | Naganuma | G03G 21/1638 |
| 2018/0157200 A1* | 6/2018 | Endoh | G03G 15/6564 |

* cited by examiner

IMAGE FORMING APPARATUS FOR DOUBLE-SIDED CONVEYANCE

CROSS REFERENCE TO RELATED APPLICATIONS

The entire disclosures of Japanese Patent Application No. 2017-117836 filed on Jun. 15, 2017, No. 2017-132167 filed on Jul. 5, 2017, and No. 2018-99410 filed on May 24, 2018 are incorporated herein by reference in their entirety.

BACKGROUND

Technological Field

The present invention relates to an image forming apparatus.

Description of Related Art

Conventionally known are image forming apparatuses using a toner for forming an image on a sheet. Some of those image forming apparatuses include an inverting conveyance path constituting a conveyance pathway that inverts a sheet by switchback-inverting (i.e., reversing) the to-and-fro of the sheet conveyance direction, thereby forming images on both sides of the sheet by inverting the sheet (refer to, for example, Japanese Patent Application Laid-Open No. 2006-124100).

In a conventional image forming apparatus, switchback-inverting through an inverting conveyance path is possible for a sheet in a size that can be housed in a sheet feeding tray unit.

In recent years, there is an increasing demand for forming images on both sides of a flat sheet referred to as a long sheet whose size is larger than the size capable of being housed in a sheet feeding tray unit. For duplex printing on a long sheet, it is necessary to increase the pathway length of the inverting conveyance path. Increasing the pathway length of the inverting conveyance path requires a larger apparatus, and a measure for preventing jams which are prone to occur as compared to a standard-size sheet.

A configuration, for example, that easily handles a jam of a sheet during duplex printing is known, in which members for duplex printing, such as the above-described inverting conveyance path and conveyance rollers are formed in one unit, and the unit can be moved from and into the apparatus body. Such a unit is referred to as, for example, an automatic double-side inverting conveyance unit (ADU: Auto Duplex Unit).

With the inverting conveyance path being made movable from and into the apparatus body, jams are more likely to occur by jamming of a sheet when alignment accuracy between the inverting conveyance path and a conveyance path fixed to the apparatus body side is poor. In particular, when the inverting conveyance path is made to extend in a longer pathway and also made movable from and into the apparatus body, it becomes important to maintain, with high accuracy through the entire pathway, a gap that forms the conveyance path, namely a gap (clearance) between guide members where sheets are conveyed.

SUMMARY

An object of the present invention is to provide an image forming apparatus capable of stable conveying of a long sheet when forming images on both sides of the long sheet.

To achieve at least one of the abovementioned objects, an image forming apparatus reflecting one aspect of the present invention includes:

an image former for forming a toner image on a long sheet, an image fixer for fixing the toner image formed on the long sheet;

a main conveyance path for conveying the long sheet to the image former and the image fixer; and a double-side conveyance path which branches off from a first side, in the main conveyance path, downstream of the image fixer in a conveyance direction of the long sheet, the double-side conveyance path conveying the long sheet to a second side upstream of the image former by reversing the conveyance direction at a point of switching back to invert the long sheet, in which:

the double-side conveyance path includes, in a downstream side in the conveyance direction before the switching back, a merging pathway connected to the second side upstream of the image former in the main conveyance path, and in which:

the image forming apparatus includes a first introducer for introducing into the merging pathway a head of the long sheet in the conveyance direction before the switching back.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
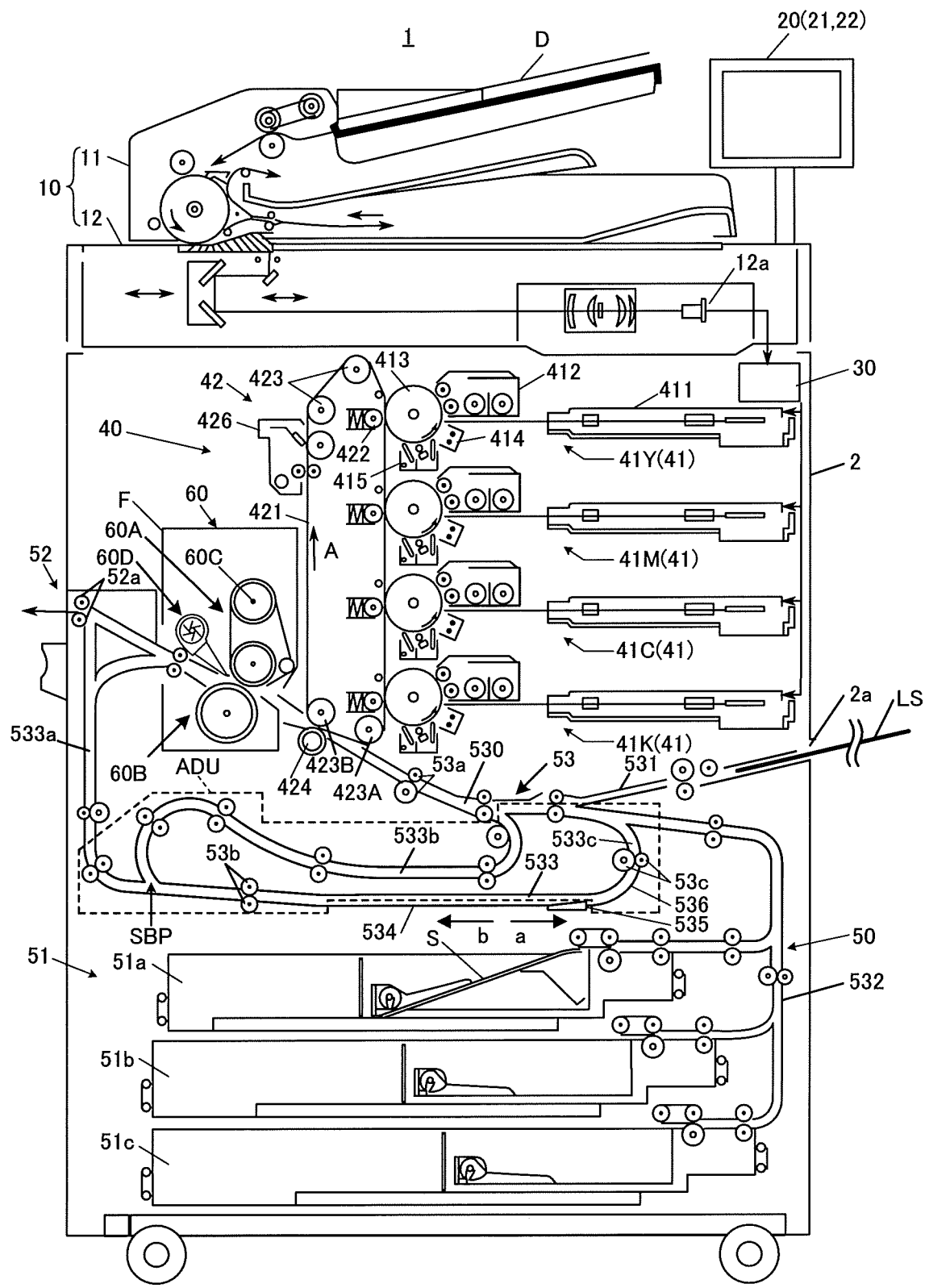
FIG. 1 illustrates a configuration example of an image forming apparatus in the present embodiment.
Figure 2:
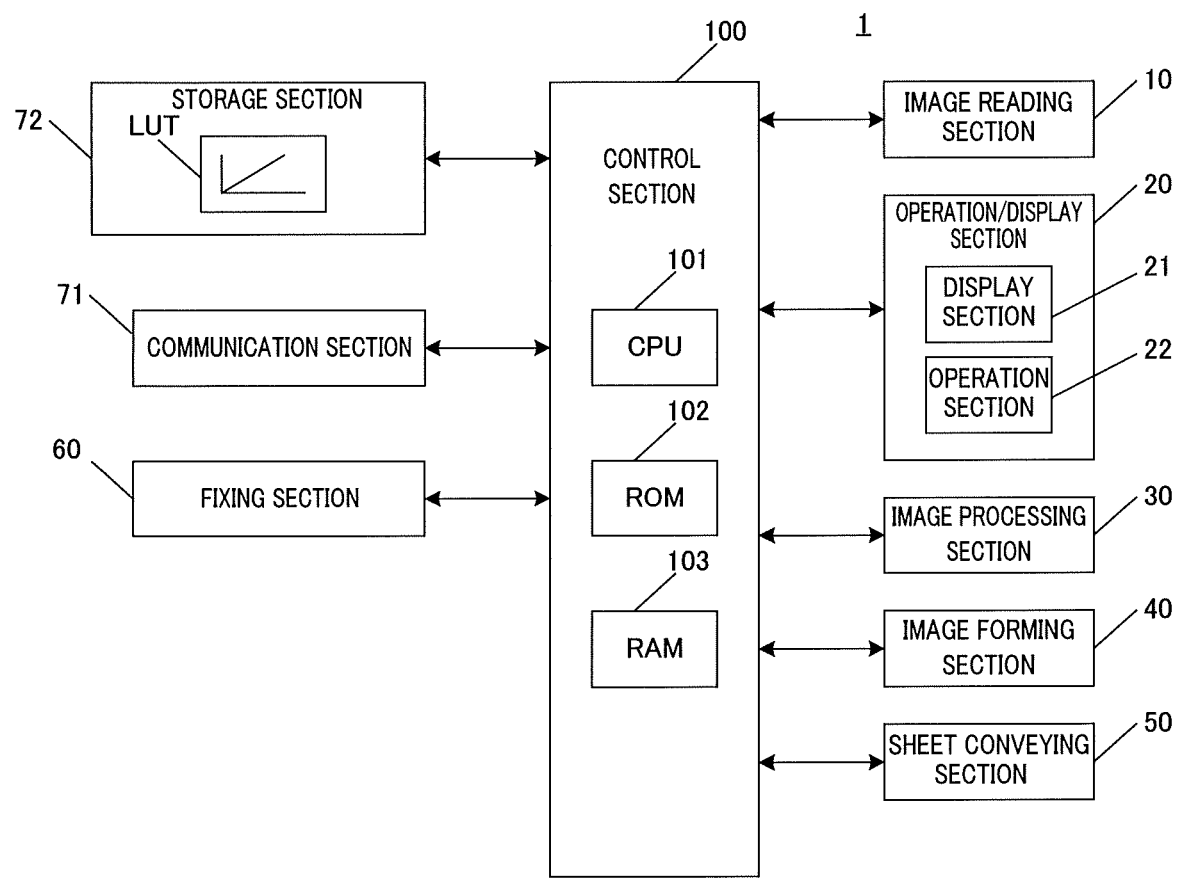
FIG. 2 illustrates a main section of a control system of the image forming apparatus of FIG. 1.
Figure 3:
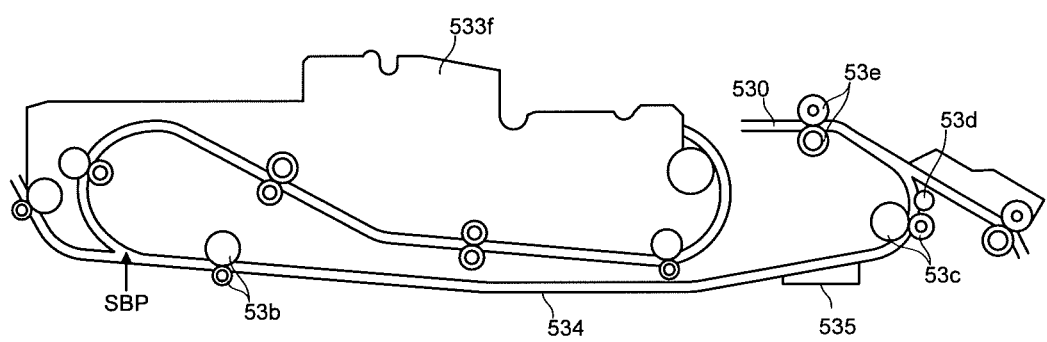
FIG. 3 illustrates an extracted conveyance pathway for duplex printing.

FIG. 1 schematically illustrates a whole configuration of image forming apparatus 1 according to the embodiment of the present invention. FIG. 2 illustrates a main section of a control system of image forming apparatus 1 according to the present embodiment. FIG. 3 illustrates an extracted conveyance pathway for duplex printing in image forming apparatus 1.

Image forming apparatus 1 of the present embodiment uses long sheet LS or sheet S (i.e., non-long sheet) as a recording medium, and forms an image on long sheet LS or sheet S.

In the present embodiment, long sheet LS is a flat sheet with a length in a conveyance direction longer than commonly used sheets, such as A4 size and A3 size sheets, and such that the long sheet cannot be housed in sheet feeding tray units 51*a* to 51*c* in the apparatus. The size of long sheet LS, namely the dimensions, such as the length in the conveyance direction, is stored in a memory in the system as definition data. Hereinafter, the simply referred "sheet" may be both long sheet LS and sheet S.

Image forming apparatus 1 is an intermediate transfer-mode color image forming apparatus utilizing an electrophotographic process. Image forming apparatus 1 transfers color toner images of yellow (Y), magenta (M), cyan (C), and black (K) formed on respective photoconductor drums 413 to intermediate transfer belt 421 (primary transfer) for superimposing the four color toner images on intermediate transfer belt 421, and then transfers the same to a sheet to form a toner image (secondary transfer).

Image forming apparatus 1 employs a tandem mode in which photoconductor drums 413 corresponding to respective four colors of Y, M, C, and K are disposed in series in the running direction of intermediate transfer belt 421, and color toner images are successively transferred to intermediate transfer belt 421 in a single procedure.

As illustrated in FIG. 2, image forming apparatus 1 includes image reading section 10, operation/display section 20, image processing section 30, image forming section 40, sheet conveying section 50, fixing section 60, control section 100 and the like.

Control section 100 includes central processing unit (CPU) 101, read-only memory (ROM) 102, random-access memory (RAM) 103, and the like. CPU 101 reads from ROM 102 a program corresponding to processing details, loads the program into RAM 103, and performs, cooperatively with the loaded program, centralized control of the operations in respective blocks of image forming apparatus 1. During this step, various data stored in storage section 72 are referred to. Storage section 72 is composed of, for example, a nonvolatile semiconductor memory (so-called flash memory) and/or a hard disk drive.

Control section 100 transmits and receives, via communication section 71, various data to and from an external apparatus (e.g., personal computer) connected to a communication network, such as a local area network (LAN) or a wide area network (WAN). Control section 100, for example, receives image data transmitted from the external apparatus, and operates to form a toner image on a sheet based on the image data (input image data). Communication section 71 is composed of, for example, a communication control card, such as a LAN card.

Image reading section 10 includes auto document feeder (ADF) 11, document image scanner 12 and the like.

Auto document feeder 11 conveys, with a conveying mechanism, document D placed on a document tray and sends the same to document image scanner 12. Auto document feeder 11 can continuously read images on multiple documents D (including images on both sides thereof) placed on the document tray in a short period of time.

Document image scanner 12 optically scans a document conveyed from auto document feeder 11 onto a contact glass or a document placed on a contact glass, and images light reflected from the document on a light receiving surface of charge coupled device (CCD) sensor 12*a* to read a document image. Image reading section 10 generates input image data based on the results read by document image scanner 12. The input image data is subjected to predetermined image processing in image processing section 30.

Operation/display section 20 is composed of, for example, a touch panel-type liquid crystal display (LCD), and functions as both display section 21 and operation section 22. Display section 21 displays various operation screens, image conditions, operation conditions of each function, and/or the like in accordance with display control signals input from control section 100. Operation section 22 equipped with various operation keys, such as a numeric keypad and a start key, receives various input operation from users and outputs operation signals to control section 100.

Image processing section 30 includes, for example, a circuit that performs digital image processing of input image data in accordance with default settings or user settings. Image processing section 30 performs, for example, tone correction based on tone correction data (tone correction table LUT) in storage section 72 under the control of control section 100. In addition to the tone correction, image processing section 30 also performs, for input image data, various correction processing, such as color correction or shading correction, compression processing, and/or the like. Image forming section 40 is controlled based on the processed image data.

Image forming section 40 includes, for example, intermediate transfer unit 42 and image forming units 41Y, 41M, 41C, and 41K for forming images with color toners of respective Y, M, C, and K components based on input image data.

Image forming units 41Y, 41M, 41C, and 41K for respective Y, M, C, and K components have similar configurations. For convenience in illustration and description, common components are denoted by the same numerals and such numerals are accompanied by Y, M, C, or K when they are to be distinguished. In FIG. 1, only components of image forming unit 41Y for Y component are denoted by numerals, and numerals are omitted for components of other image forming units 41M, 41C, and 41K.

Image forming unit 41 includes exposing device 411, developing device 412, photoconductor drum 413, charging device 414, drum cleaning device 415 and the like.

Photoconductor drum 413 is, for example, a negative-charging organic photoconductor (OPC) formed by successively laminating, on a peripheral surface of aluminum conductive cylinder (aluminum tube), an undercoat layer (UCL), a charge generation layer (CGL), and a charge transport layer (CTL). The charge generation layer is formed from an organic semiconductor composed of a charge generation material (e.g., phthalocyanine pigment) dispersed in a resin binder (e.g., polycarbonate resin), and generates pairs of positive charges and negative charges upon exposure using exposing device 411. The charge transport layer is formed from a hole transport material (electron-donating nitrogen compound) dispersed in a resin binder (e.g., polycarbonate resin), and transports positive charges generated in the charge generation layer to the surface of the charge transport layer.

Control section 100 rotates photoconductor drum 413 at a constant peripheral speed (linear speed) by controlling driving current supplied to a driving motor (not shown) that rotates photoconductor drum 413.

Charging device 414 evenly and negatively charges the surface of photoconductive photoconductor drum 413. Exposing device 411 is composed of, for example, a semiconductor laser, and irradiates photoconductor drum 413 with laser beams corresponding to an image of each color component. Positive charges are thus generated in the charge generation layer of photoconductor drum 413, and transported to the surface of the charge transport layer, thereby neutralizing surface charges (negative charges) of photoconductor drum 413. As a result, electrostatic latent images of color components are formed on the surfaces of respective photoconductor drums 413 due to potential differences from the surroundings.

Developing device 412 is, for example, of a two-component developing system, and forms a toner image by attaching a toner of each color component to the surface of photoconductor drum 413 to visualize the electrostatic latent image.

Drum cleaning device 415 includes, for example, a cleaning member to be slid on the surface of photoconductor drum 413, and using the cleaning member, removes residual toner remaining on the surface of photoconductor drum 413 after primary transfer.

Intermediate transfer unit 42 includes intermediate transfer belt 421 serving as an image carrier, primary transfer rollers 422, a plurality of support rollers 423, secondary transfer roller 424, belt cleaning device 426, and the like.

Intermediate transfer belt 421 is composed of an endless belt, and looped around the support rollers 423 under tension. At least one of the support rollers 423 is a driving roller, and the rest are driven rollers. For example, roller 423A, which is disposed downstream of primary transfer roller 422 for K component in the running direction of the belt, is preferably a driving roller. This facilitates to maintain a constant running speed of the belt in a primary transfer section. Intermediate transfer belt 421 runs in arrow A direction at a constant speed by the rotation of driving roller 423A.

Primary transfer roller 422 is disposed to face photoconductor drum 413 for each color component, and on the inner peripheral surface side of intermediate transfer belt 421. A primary transfer nip, for transferring a toner image to intermediate transfer belt 421 from photoconductor drum 413, is formed by firmly pressing primary transfer roller 422 on photoconductor drum 413 with intermediate transfer belt 421 therebetween.

Secondary transfer roller 424 is disposed to face backup roller 423B disposed downstream of driving roller 423A in the running direction of the belt, and on the outer peripheral surface side of intermediate transfer belt 421. A secondary nip, for transferring a toner image to a sheet from intermediate transfer belt 421, is formed by firmly pressing secondary transfer roller 424 on backup roller 423B with intermediate transfer belt 421 therebetween.

When intermediate transfer belt 421 passes through the primary transfer nip, toner images on photoconductor drums 413 are successively superimposed and transferred to intermediate transfer belt 421 (primary transfer). Specifically, primary transfer bias is applied to primary transfer roller 422 to impart an charge with polarity opposite to the toners to the rear surface side of intermediate transfer belt 421 (side to be in contact with primary transfer roller 422), thereby transferring the toner image to intermediate transfer belt 421 electrostatically.

Subsequently, when the sheet passes through the secondary transfer nip, the toner images on intermediate transfer belt 421 are transferred to the sheet (secondary transfer). Specifically, secondary transfer bias is applied to secondary transfer roller 424 to impart an charge with polarity opposite to the toners to the rear surface side of the sheet (side to be in contact with secondary transfer roller 424), thereby transferring the toner images to the sheet electrostatically. The sheet bearing the transferred toner images is conveyed to fixing section 60.

Belt cleaning device 426 includes a belt cleaning blade or the like to be slid on the surface of intermediate transfer belt 421, and removes a residual toner remaining on the surface of intermediate transfer belt 421 after the secondary transfer. In place of secondary transfer roller 424, a configuration in which a secondary transfer belt is looped around a plurality of support rollers including a secondary transfer roller under tension (so-called belt-type secondary transfer unit) may be employed.

Fixing section 60 includes upper-side fixing section 60A which includes a fixing surface-side member to be disposed on the fixing surface side of the sheet (toner image-formed surface), lower-side fixing section 60B which includes a rear surface-side support member to be disposed on the rear surface side of the sheet (surface opposite the fixing surface), heating source 60C, and the like. A fixing nip, for gripping and conveying the sheet, is formed by firmly pressing the rear surface-side support member on the fixing surface-side member.

Fixing section 60 heats and presses the conveyed sheet having thereon the toner images transferred (secondary transfer) at the fixing nip, thereby fixing the toner images on the sheet. Fixing section 60 is disposed inside fixing device F as a unit. Also disposed in fixing device F is air separation unit 60D for separating the sheet from the fixing surface-side member by blowing air.

Sheet conveying section 50 includes sheet feeding section 51, sheet ejection section 52, conveyance pathway section 53, and the like. Three sheet feeding tray units 51a to 51c which constitute sheet feeding section 51 house sheets S classified based on basis weight (stiffness), size, and/or the like (standard sheet, special sheet) and in accordance with predetermined types. Conveyance pathway section 53 includes a plurality of conveyance rollers, such as registration roller pair 53a, a double-side conveyance pathway for forming images on both sides of a sheet, and the like. Conveyance pathway section 53 will be described in detail below.

Sheets S housed in sheet feeding tray units 51a to 51c are each sent out from the topmost part of the unit and conveyed to image forming section 40 through conveyance pathway section 53. During this step, a registration roller section where registration roller pair 53a is disposed corrects the tilt of sheet S fed, and adjusts the timing of conveyance. The toner images on intermediate transfer belt 421 are then simultaneously transferred to one of the surfaces of sheet S in image forming section 40 (second transfer), and a fixing step is performed in fixing section 60. Sheet S bearing a formed image thereon is ejected outside the apparatus using sheet ejection section 52 equipped with sheet ejection rollers 52a.

In the following, conveyance pathway section 53 will be described in detail.

Conveyance pathway section 53 conveys a sheet during the formation of an image on one side (upper surface) of the sheet, and includes main conveyance path 530 which conveys the sheet for forming a toner image thereon in image forming section 40. Main conveyance path 530 conveys the sheet through resist rollers 53a, the secondary transfer nip of image forming section 40, and fixing section 60. Conveyance pathway section 53 also includes inverting conveyance path 533 for inverting the sheet to turn the front of the sheet to the back and the back to the front.

Conveyance pathway section 53 includes external sheet feeding-conveyance path 531 for conveying a sheet, such as long sheet LS fed through external sheet feeding slot 2a to main conveyance path 530, and sheet feeding-conveyance path 532 for conveying sheet S fed from sheet feeding tray units 51a to 51c to main conveyance path 530.

Main conveyance path 530 is provided inside apparatus body 2 above sheet feeding tray units 51a to 51c, and extends from one lateral side to the other lateral side of apparatus body 2. Main conveyance path 530 is connected at one end thereof to external sheet feeding-conveyance path 531 and sheet feeding-conveyance path 532. Main conveyance path 530 is connected at the other end thereof to an ejection slot of sheet ejection section 52 provided on the other lateral side of apparatus body 2.

External sheet feeding-conveyance path 531 is connected at one end thereof to external sheet feeding slot 2a, and at the other end thereof to main conveyance path 530. Sheet feeding-conveyance path 532 is provided in apparatus body 2 and close to the one lateral side of apparatus body 2, and extends from sheet feeding tray units 51a to 51c to main conveyance path 530 in the vertical direction. Opening of a door (not shown) provided on the one lateral side of apparatus body 2 makes possible to handle a jam or the like, by exposing a part of sheet feeding-conveyance path 532 to the outside. Sheet feeding-conveyance path 532 is connected at the upper end thereof to main conveyance path 530, and at the lower end thereof to sheet feeding tray units 51a to 51c.

Inverting conveyance path 533 is provided inside apparatus body 2 between sheet feeding tray units 51a to 51c and main conveyance path 530, and extends from the one lateral side to the other lateral side of apparatus body 2. Inverting conveyance path 533 includes: first circulating conveyance path 533a branching off downward from main conveyance path 530 on a side downstream of fixing section 60 in the conveyance direction of a sheet conveyed in main conveyance path 530; and second circulating conveyance path 533b merging with main conveyance path 530 on a side upstream of the secondary transfer nip of image forming section 40 in the conveyance direction.

Inverting conveyance path 533 is connected at one end thereof to first circulating conveyance path 533a and second circulating conveyance path 533b. The one end of inverting conveyance path 533, where the path is connected to first circulating conveyance path 533a and second circulating conveyance path 533b, serves as a point of switching back (herein also referred to as "switchback point SBP" where the running direction (conveyance direction) of a sheet is reversed during duplex printing. Hereinafter, in inverting conveyance path 533, the conveyance direction represented by arrow a in which a sheet is conveyed from first circulating conveyance path 533a is referred to as the forward (or forward conveyance) direction, and the conveyance direction represented by arrow b in which the sheet is conveyed to second circulating conveyance path 533b is referred to as the backward (or backward conveyance) direction.

Inverting conveyance path 533 also includes conveyance rollers 53b as switchback rollers downstream of switchback point SBP in the forward conveyance direction. Driving force of a motor (not shown) is transmitted to conveyance rollers 53b, thereby conveying a sheet in both forward direction and backward direction.

Figure 4:
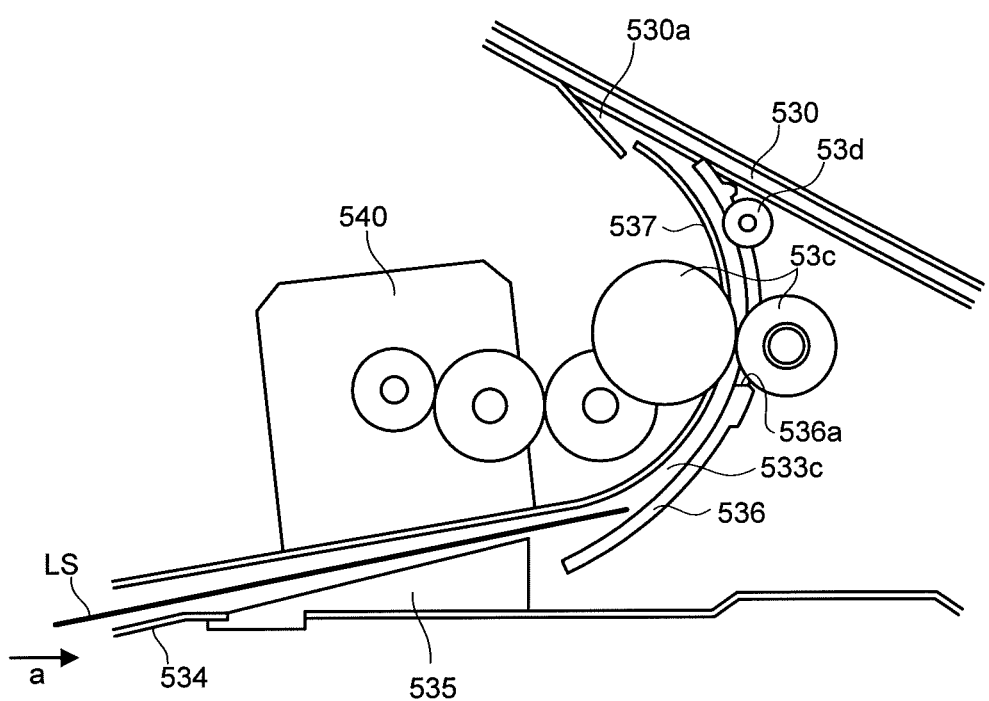
FIG. 4 illustrates an enlarged merging pathway.

Downstream of conveyance rollers 53b in the forward conveyance direction of inverting conveyance path 533, merging conveyance path 533c as a double-side pathway is provided, which merges with main conveyance path 530 and connects inverting conveyance path 533 and main conveyance path 530. FIG. 4 illustrates enlarged merging conveyance path 533c. Merging conveyance path 533c is a curved conveyance path having a shape bent upward in the conveyance direction of a sheet before switching back.

Merging conveyance path 533c is a double-side pathway used for duplex printing of a sheet (mainly long sheet LS), and merges with main conveyance path 530 upstream of resist rollers 53a in the conveyance direction of the sheet conveyed in the forward direction. In the present example, merging conveyance path 533c merges with main conveyance path 530 upstream of the merging point of main conveyance path 530 and second circulating conveyance path 533b. Further, merging conveyance path 533c merges with main conveyance path 530 so that a sheet is conveyed in main conveyance path 530 to the left in the drawings.

Merging of inverting conveyance path 533 with main conveyance path 530 enables duplex printing of long sheet LS while preventing apparatus body 2 and whole image forming apparatus 1 from becoming larger. In the present embodiment, bending backward in apparatus body 2 a side of a conveyance pathway downstream in the conveyance direction before the switching back enables increasing of the pathway length of inverting conveyance path 533 while preventing image forming apparatus 1 (e.g., apparatus body 2) from becoming larger. A configuration in which merging conveyance path 533c of inverting conveyance path 533 connected to a side upstream of image forming section 40 in main conveyance path 530 enables duplex printing of long sheet LS whose size in the conveyance direction is larger.

As illustrated, merging conveyance path 533c is curved and extended upward so that a conveyed sheet is bent backward. Accordingly, long sheet LS may, depending on the length thereof, be conveyed in such a way that the head of the first surface having a toner image formed thereon is brought upward in merging conveyance path 533c before the switching back during duplex printing. During the procedure, the conveying force of conveyance rollers 53b may become unsatisfactory depending on the type of long sheet LS (stiffness, size and/or the like). When the conveying force of conveyance rollers 53b before the switching back is unsatisfactory, for example, the head of the first surface of long sheet LS cannot climb merging conveyance path 533c and thus the last end of the same long sheet LS cannot pass through switchback point SBP in some cases.

In the present embodiment, conveyance rollers 53c for conveying long sheet LS are additionally provided on merging conveyance path 533c. Conveyance rollers 53c are a pair of rollers facing each other. As illustrated in FIG. 4, the first roller of the pair is provided in an opening of inner sheet guide 537 constituting merging conveyance path 533c, and driven by motor 540, that is a driving source different from that for conveyance rollers 53b. The second roller of the pair of conveyance rollers 53c is provided in an opening of outer sheet guide 536 constituting merging conveyance path 533c, and rotates to follow the rotation of the first roller. Specifically, conveyance rollers 53b and 53c are driven to be synchronously rotated under the control of control section 100 to have the same conveyance direction and peripheral speed (sheet conveying speed).

Providing a driving source for conveyance rollers 53c different from that for conveyance rollers 53b can reduce the load on the driving source (motor) for conveyance rollers 53b after the head of long sheet LS enters between conveyance rollers 53c.

The conveyance of long sheet LS in the backward direction after the switching back, as compared with before the switching back, is in the downward direction in the conveyance path, and therefore, only the conveying force of conveyance rollers 53b is sufficient. During the backward conveyance, meanwhile, long sheet LS being held between conveyance rollers 53c increases the load on conveyance rollers 53b, and thus the conveying force may become unsatisfactory. In the present embodiment, an actuator or the like (not illustrated) is connected to conveyance rollers 53c so that conveyance rollers 53c can retreat from merging conveyance path 533c. Control section 100 outputs control signals to the actuator or the like during the backward conveyance after the switching back so that conveyance rollers 53c are separated from long sheet LS.

In the present embodiment, another actuator or the like (not illustrated) is also connected to conveyance rollers 53e (refer to FIG. 3) disposed on main conveyance path 530 so that conveyance rollers 53e can retreat from main conveyance path 530. Conveyance rollers 53e are originally for printing only on one side (first surface) of a sheet, and do not have a motor capable of reversing. Therefore, when the head of long sheet LS passes between conveyance rollers 53e during the forward conveyance before the switching back, control section 100 outputs control signals to the actuator or the like for conveyance rollers 53e so that conveyance rollers 53e are separated from long sheet LS during the backward conveyance after the switching back.

With reference to FIG. 3, the distance between conveyance rollers 53b and conveyance rollers 53c is set to a distance, for example of about 400 mm, which is longer than the size of sheet S (standard-size sheet) in the conveyance direction thereof. Therefore, in the present embodiment, control section 100 does not control to drive motor 540 for conveyance rollers 53c during duplex printing of sheet S, namely a non-long sheet. This can reduce power consumption and simplify the control during duplex printing of non-long sheets.

The present embodiment having such a configuration can ensure satisfactory conveying force for bringing up long sheet LS before the switching back toward main conveyance path 530 during duplex printing of long sheet LS.

Further, in the conveyance of long sheet LS after switching back, conveyance rollers 53c are separated from long sheet LS and the operation of motor 540 for conveyance rollers 53c becomes unnecessary, thereby reducing power consumption for the conveyance after the switching back.

In the meanwhile, as merging conveyance path 533c is curved so that a conveyed sheet is bent backward, a guide (right-side sheet guide in FIG. 4) facing the first surface of long sheet LS having a toner image formed thereon may be rubbed on the first surface. In such a case, depending on the stiffness (toughness) or the like of long sheet LS, the first surface of long sheet LS may suffer a scratch.

Specifically, when the distance from conveyance rollers 53b to merging conveyance path 533c is large as in the present example, the free length of long sheet LS from conveyance rollers 53b can be ensured, and thus long sheet LS is generally less likely to suffer a scratch thereon upon rubbing on the facing sheet guide. In the present embodiment, meanwhile, conveyance rollers 53c are provided in merging conveyance path 533c, and thus a part of long sheet LS, which passes between conveyance rollers 53c to a downstream side in the forward conveyance, is pressed with its free length short to the sheet guide of merging conveyance path 533c. The part of long sheet LS pressed on the sheet guide with its free length short thus has seemingly high stiffness, namely a high pressure on the sheet guide, which leads to higher possibility of scratches.

For this disadvantage, wheel 53d which comes in contact with the surface on which an image is formed (herein also referred to as "image formed-surface") of long sheet LS and rotates thereon is provided in a region of merging conveyance path 533c, which may suffer the above described scratches or the like, in the present embodiment. Such a configuration can prevent rubbing of the first surface of long sheet LS on the sheet guide, thereby preventing scratches.

As illustrated in FIGS. 3 and 4, wheel 53d is located downstream of conveyance rollers 53c in the forward conveyance direction. Wheel 53d is located close to conveyance rollers 53c in merging conveyance path 533c, and the axis of wheel 53d is parallel to those of conveyance rollers 53c. Wheel 53d is disposed so as to face merging conveyance path 533c (and the first surface of long sheet LS) from an opening provided at outer sheet guide 536 which constitutes merging conveyance path 533c and faces the first surface of long sheet LS. As wheel 53d is a part of the ADU, wheel 53d is movable from and into apparatus body 2.

In merging conveyance path 533c, a region upstream of conveyance rollers 53c in the forward conveyance direction is where the head of long sheet LS in the conveyance direction bumps into. Rubbing of long sheet LS on the sheet guide is more likely to occur at the region. Therefore, wheel 53d can be alternatively or additionally provided at such a region. However, the present inventors found from experiment that providing a roller at this region more likely causes jamming of long sheet LS to lead a jam. Therefore, in the present embodiment, wheel 53d is provided in merging conveyance path 533c close to and downstream of conveyance rollers 53c in the forward conveyance direction, as described above.

In the present embodiment, sheet guide member 535 as a first introducing member for introducing the head of long sheet LS in the conveyance direction into merging conveyance path 533c is provided. Sheet guide member 535 faces the beginning of merging conveyance path 533c in the conveyance direction before the switching back. Sheet guide member 535 is provided in the vicinity of the lower end of guide plate 536 in merging conveyance path 533c, and assists and/or supports the conveyance of long sheet LS during duplex printing. Sheet guide member 535 is a step-forming member which forms a step relative to the lower end of guide plate 536 which faces sheet guide member 535 so that guide plate 536 receives the head of long sheet LS in the conveyance direction. The end downstream in sheet guide member 535 along the forward conveyance direction is located higher than the lower end of guide plate 536. The configuration of guide plate 536 will be described below.

In the present embodiment, opening 530a as a second introducing member for receiving the head of long sheet LS in the conveyance direction and introducing the same into main conveyance path 530 is provided in a lower sheet guide of main conveyance path 530. Opening 530a faces the last end of merging conveyance path 533c in the conveyance direction before the switching back. In opening 530a, a part of the lower sheet guide of main conveyance path 530 is bent and extended below the upper end of upper guide member 537. The bent part of the sheet guide thus forms a step relative to the upper end of upper guide member 537 as illustrated in FIG. 4. A merging pathway of merging conveyance path 533c and main conveyance path 530, which constitutes a pathway for the image forming on the first surface of a sheet, is thus formed on the same plane and below the lower sheet guide of main conveyance path 530. This prevent the jamming of the sheet at opening 530a during feeding of the sheet for the first surface-image forming, and thus long sheet LS can be smoothly moved between merging conveyance path 533c and main conveyance path 530.

Figure 5:
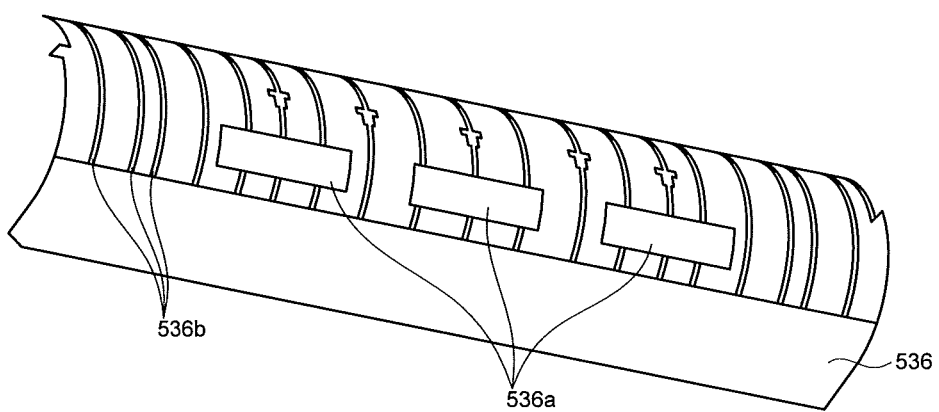
FIG. 5 is a perspective view illustrating a configuration of a guide plate.

FIG. 5 illustrates guide plate 536 constituting a part of sheet guide members in merging conveyance path 533c. As illustrated, guide plate 536 is curved to have a curvature, and has a plurality (three in this example) of openings 536a each for insertion of one (right side in FIGS. 1 and 4) of the pair of conveyance rollers 53c. As illustrated, the inner side (the side to face a sheet) of guide plate 536 has a lower region which is a flat surface, and an upper region which has a plurality of protruding ribs 536b extending in the conveyance direction.

As indicated with a dotted line in FIG. 1, inverting conveyance path 533 and rollers and the like disposed thereon can be pulled out as components of an automatic double-side inverting conveyance unit (ADU: Auto Duplex Unit) from the front of apparatus body 2.

In more detail, by pulling out of an operating lever (not shown) of the ADU for handling a jam or the like, pulled out are plate-shaped frame 533f on the back side of the apparatus illustrated in FIG. 3, most of sheet guide members constituting inverting conveyance path 533, which include merging conveyance path 533c attached to the frame 533f, rollers and the like. Among sheet guide members constituting inverting conveyance path 533, meanwhile, a part of guide member 534 serving as the bottom surface is fixed to apparatus body 2. Hereinafter, the part of guide member 534 fixed to apparatus body 2 is referred to as a body-side lower guide. The above described sheet guide member 535 is attached to body-side lower guide 534, and remains at apparatus body 2 when the ADU is pulled out.

The present embodiment thus has a configuration such that a part of the guide members constituting a double-side conveyance pathway is fixed to (remains at) apparatus body 2, and such a configuration enables easier handling of a jam when the ADU is pulled out, while preventing the ADU or whole image forming apparatus 1 from becoming larger.

Image forming apparatus 1 of the present embodiment allows long sheet LS to pass through merging conveyance path 533c before and after the switching back, thereby enabling duplex printing of long sheet LS having a longer size in the conveyance direction. According to the present embodiment, the double-side conveyance pathway is substantially in a ring shape, and thus long sheet LS is held in the inner guide members in a wound state when frame 533f and the like are pulled out for the handling of a jam. The present embodiment therefore enables easier retrieval of a jammed sheet during removal of the sheet while preventing the sheet damage (guillotine or the like).

When guide members for sheet conveyance (hereinafter referred to as sheet guides) are constituted from members in the ADU and members on apparatus body 2, and a sheet conveyance path is formed in the clearance (gap) between the sheet guides as described above, a region where the clearance of the sheet conveyance path is difficult to accurately maintain is generated due to the disadvantage described below.

The back side of the ADU can be accurately aligned to apparatus body 2 by, for example, inserting the end of frame 533f into apparatus body 2. However, it is not easy to provide such an alignment mechanism in the front side of the ADU. Specifically, the sheet conveyance path and the like are exposed on the front side of the ADU by opening a door (not shown) of apparatus body 2. Providing a member, such as frame 533f which blocks the sheet conveyance path, on the front side of the ADU makes difficult to visually confirm the state of a sheet during the handling of a jam, and complicates retrieval of the sheet. Further, since the door of apparatus body 2 is a movable member and thus is not highly rigid, the front side of the ADU cannot be accurately aligned to apparatus body 2 even if a mechanism for alignment to the door of apparatus body 2 is provided on the front side.

In general, with the configuration in which the ADU is moved from and into image forming apparatus 1 in the front-back direction (the front side to/from back side), it is difficult to maintain the accuracy of the gap, on the front side of the apparatus, between sheet guides fixed to apparatus body 2 and sheet guides which face or connect to the sheet guides fixed to apparatus body 2 and which are in the ADU to be moved from and into apparatus body 2. Specifically, the weight of the ADU tends to reduce the distance, on the front side of the apparatus, from body-side lower guide 534 and sheet guide member 535 to upper guide member 537 in the ADU, which faces body-side lower guide 534 and sheet guide member 535. Similarly, it is difficult to constantly and accurately maintain the clearance of the part connecting main conveyance path 530 and merging conveyance path 533c of the ADU, on the front side of the apparatus. The configuration with the ADU to be moved from and into apparatus body 2 thus makes difficult to appropriately maintain the gap of a conveyance pathway for long sheet LS.

Figure 6:
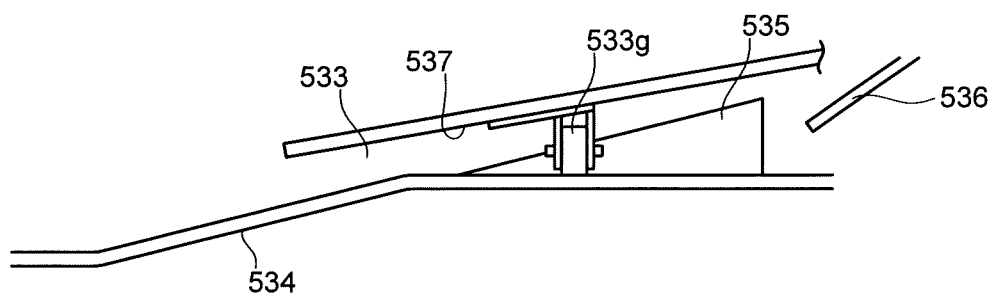
FIG. 6 illustrates an enlarged entrance side of the merging pathway.
Figure 7:
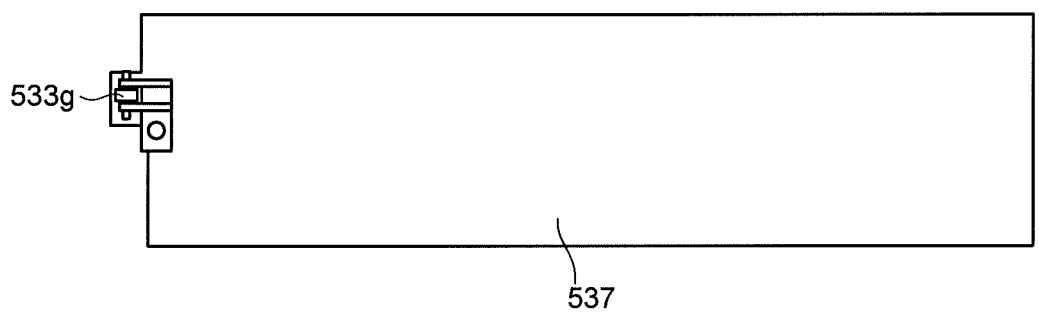
FIG. 7 illustrates the entrance side of the merging pathway viewed from the bottom of FIG. 6.

Under the above disadvantage, wheel 533g as a gap retainer to maintain a sheet conveyance space (gap) is provided between body-side lower guide 534 and upper guide member 537 (i.e., a pair of sheet guides) in the present embodiment as illustrated in FIGS. 6 and 7. FIG. 7 illustrates the entrance side of merging conveyance path 533c viewed from the bottom of FIG. 6, and in FIG. 7, the right side is the back side of the apparatus and the left side is the front side of the apparatus.

Wheel 533g is disposed outside the width of long sheet LS conveyed in the gap between body-side lower guide 534 and upper guide member 537. In this example, wheel 533g is rotatably and axially supported at the underside of upper guide member 537 on the front side of the apparatus, that is, on the end side of apparatus body 2 in the direction toward the front of apparatus body 2.

Wheel 533g is provided close to sheet guide member 535 in a position which does not interfere with sheet guide member 535. Further, wheel 533g is disposed with the axis thereof supported by upper guide member 537 so that wheel 533g is in contact with the upper surface of body-side lower guide 534 but not in contact with upper guide member 537. The axis of wheel 533g is parallel to the sheet conveyance direction, and orthogonal to the axes of sheet conveying rollers, such as conveyance rollers 53b and 53c.

With the above configuration, upper guide member 537 moves relative to body-side lower guide 534 when the ADU housed in apparatus body 2 is pulled out from the front side of the apparatus (the left side in FIG. 7). During the movement, wheel 533g in contact with body-side lower guide 534 and axially supported by upper guide member 537 acts as a wheel driven to rotate on body-side lower guide 534 in accordance with the relative movement of upper guide member 537 and body-side lower guide 534. The ADU can be thus smoothly pulled out with lowered frictional resistance to apparatus body 2 due to the rotation of wheel 533g during the pulling out of the ADU according to the present embodiment.

For returning the pulled out ADU into apparatus body 2, wheel 533g acts as a wheel in a similar manner when placed on body-side lower guide 534, and continues to rotate on body-side lower guide 534 until positioning of the back side of the ADU (frame 533f) is completed. When the returning of the ADU into apparatus body 2 is completed, wheel 533g stops at the position in front of sheet guide member 535 (refer to FIG. 6), and supports or presses upper guide member 537 from the bottom, thereby maintaining a constant gap (clearance) between body-side lower guide 534 and upper guide member 537.

According to the present embodiment using wheel 533g as a gap retaining member for maintaining a gap between a pair of sheet guides, a simple and inexpensive configuration can maintain a constant gap of a sheet conveyance path, and improves the accuracy of the clearance, thereby stabilizing or improving the conveyance of long sheet LS during duplex printing.

In the present embodiment, as described above, steps are formed in the part connecting an end of guide plate 536 forming merging conveyance path 533c and body-side lower guide 534, and the part connecting the end of upper guide member 537 and a guide member of main conveyance path 530, respectively. The present embodiment thus has a configuration capable of absorbing an error of clearance between guides, by providing steps between the guides, in regions where an error of the clearance may occur and no sufficient space is available for disposing wheel 533g. This can stabilize the conveyance of long sheet LS during duplex printing.

In the following, the conveyance operation during duplex printing will be described.

Firstly, the case where duplex printing is performed on sheets S fed from sheet feeding tray units 51a to 51c is described. In image forming apparatus 1, a toner image is transferred and fixed on the upturned surface (first surface) of sheet S which is conveyed in main conveyance path 530 in the forward direction (to the left in FIG. 1) to pass through image forming section 40 and fixing section 60. Subsequently, control section 100 controls the conveyance of sheet S so that sheet S is conveyed from main conveyance path 530 to inverting conveyance path 533 via first circulating conveyance path 533a. Control section 100 further controls, when the last end of sheet S in the conveyance direction passes through switchback point SBP, the conveyance of sheet S so that sheet S is conveyed from inverting conveyance path 533 to main conveyance path 530 via second circulating conveyance path 533b by switching the rotation direction of conveyance rollers 53b to invert the conveyance direction.

Such conveyance control conveys sheet S (i.e., non-long sheet) in the forward conveyance direction represented by arrow a so that the last end of sheet S passes through switchback point SBP before the head of the same sheet S enters merging conveyance path 533c. Sheet S is then conveyed to main conveyance path 530 via second circulating conveyance path 533b with the first surface (i.e., the image formed-surface) downturned, and another image is formed on the upturned second surface. Control section 100 controls the conveyance of sheet S having toner images formed on both sides so that sheet S is ejected from main conveyance path 530 to sheet ejection section 52. Therefore, for the duplex printing of sheet S that is non-long sheet, sheet S is not conveyed to merging conveyance path 533c.

Secondly, the case where duplex printing is performed on long sheet LS using merging conveyance path 533c is described. The following is an example for conveying, in inverting conveyance path 533 in the forward conveyance direction, long sheet LS having a length such that the sheet is conveyed through merging conveyance path 533c into main conveyance path 530.

Long sheet LS is conveyed from external sheet feeding slot 2a of apparatus body 2 to main conveyance path 530 via external sheet feeding-conveyance path 531 in the forward direction (to the left in FIG. 1). Long sheet LS passes through image forming section 40 and fixing section 60 as with sheet S for transferring and fixing of a toner image on the upturned first surface of long sheet LS. Long sheet S is then conveyed from main conveyance path 530 to inverting conveyance path 533 via first circulating conveyance path 533a. When long sheet LS is conveyed in inverting conveyance path 533 in the forward direction represented by arrow a, control section 100 controls to drive conveyance rollers 53b so that the head of long sheet LS in the conveyance direction enters merging conveyance path 533c.

During the conveyance, long sheet LS slides on sheet guide member 535 (step-forming member) so that the head side of long sheet LS is conveyed upward by the slope of sheet guide member 535, as illustrated in FIG. 4. The head of long sheet LS then comes in contact with the flat surface region on the lower side of guide plate 536 (refer to FIG. 5), moves (is conveyed upward) along the curved shape of guide plate 536 to enter between conveyance rollers 53c. The flat surface part of guide plate 536 receives the head of long sheet, and the flat surface uniformly disperses the stress caused by long sheet LS bumping into guide plate 536. This prevents buckling or the like of long sheet LS in curved merging conveyance path 533c.

Control section 100 outputs drive signals to a driving source (motor 540) for starting the rotation of conveyance rollers 53c at the time of the head of long sheet LS entering between conveyance rollers 53c, thereby conveying long sheet LS in the forward direction by both pairs of conveyance rollers 53b and 53c. Control section 100 outputs drive signals to respective driving sources so that conveyance rollers 53b and conveyance rollers 53c have the same peripheral speed.

Figure 8:
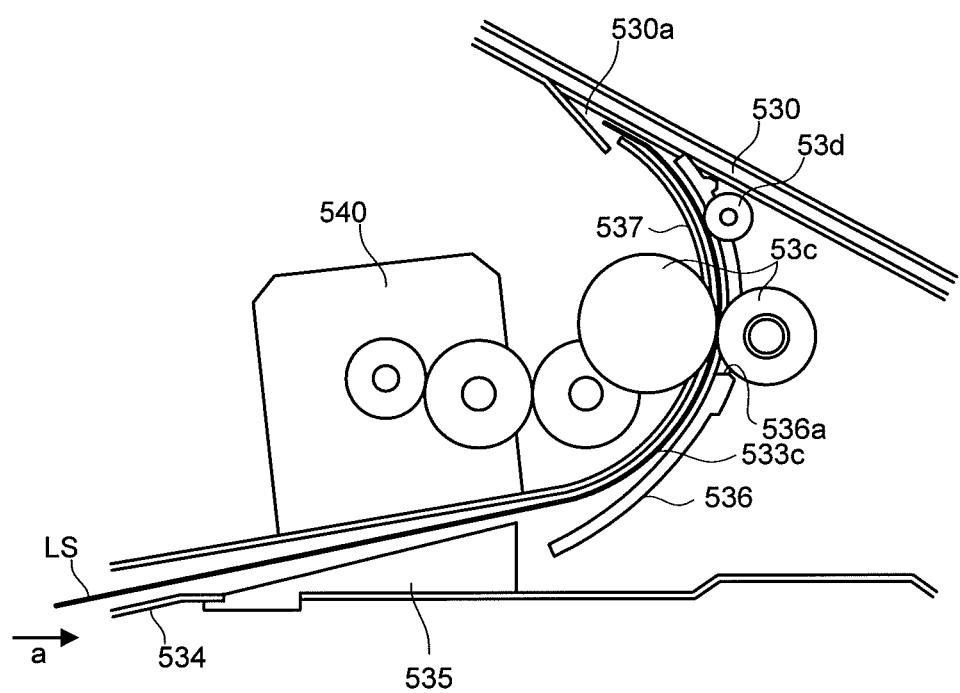
FIG. 8 is a view for explaining duplex printing of a long sheet.

Long sheet LS is then conveyed by both pairs of conveyance rollers 53b and 53c while in contact with ribs 536b of guide plate 536, and the head side of long sheet LS in the conveyance direction enters main conveyance path 530 through above described opening 530a. As wheel 53d which faces merging conveyance path 533c from an outer sheet guide forming merging conveyance path 533c is provided, the head of the first surface of long sheet LS touches wheel 53d but not the sheet guide after passing between conveyance rollers 53c. Wheel 53d is then driven to rotate in the clockwise direction in FIG. 4 in accordance with the movement of the first surface of long sheet LS in contact. According to the present embodiment, the function of wheel 53d can effectively prevent scratches caused by rubbing of the first surface of long sheet LS on the sheet guide. Further, as a step is formed between the upper end of upper guide member 537 forming merging conveyance path 533c and the lower sheet guide (opening 530a) of main conveyance path 530, long sheet LS is smoothly introduced into main conveyance path 530 from the step part of opening 530a (refer to FIG. 8).

When the last end of long sheet LS in the conveyance direction passes through switchback point SBP, control section 100 performs a switchback operation, namely switching the rotation direction of conveyance rollers 53b and 53c to invert the conveyance direction. During the conveyance in the backward direction after the switching back, control section 100 outputs drive signals to motor 540 to rotate conveyance rollers 53c in reverse at a peripheral speed substantially the same as that of conveyance rollers 53b.

Control section 100 controls the conveyance so that long sheet LS is conveyed from inverting conveyance path 533 to main conveyance path 530 via second circulating conveyance path 533b during the above operation.

As another example for the switchback operation, the following can be employed. When the last end of long sheet LS in the conveyance direction passes through switchback point SBP, control section 100 separates conveyance rollers 53c (allows to retreat) from long sheet LS while switching the rotation direction of conveyance rollers 53b to invert the conveyance direction.

In general, regarding the conveyance rollers between which long sheet LS enters before and after the switching back, the configuration thereof differs in accordance with the types of, for example, driving sources (motors) that drive the rotation of the conveyance rollers. For example, conveyance rollers which rotate only in one direction are separated from the conveyance path, and conveyance rollers which can rotate in both forward and backward directions are not separated from the conveyance path.

The last end of long sheet LS in the conveyance direction is moved through main conveyance path 530 in the backward direction (to the right in FIG. 4), and the head of long sheet LS in the conveyance direction is conveyed from inverting conveyance path 533 to main conveyance path 530 via second circulating conveyance path 533b, when such conveyance control conveys long sheet LS in the backward direction with its conveyance direction inverted.

As with sheet S, long sheet LS is then conveyed to main conveyance path 530 via second circulating conveyance path 533b with the first surface (i.e., the image formed-surface) downturned, and another toner image is transferred and fixed on the upturned second surface. Control section 100 controls the conveyance of long sheet LS having toner images formed on both sides so that long sheet LS is ejected from main conveyance path 530 to sheet ejection section 52.

From the foregoing, the present embodiment is capable of stable conveyance of long sheet LS in the conveyance during duplex printing for long sheet LS to thus improve the conveyance of long sheet LS, which leads to prevention or suppression of jamming of long sheet LS.

The above described embodiment has a configuration in which wheel 533g is attached to upper guide member 537 (i.e., ADU side) and rotates to follow the relative movement of body-side lower guide 534 during the movement of the ADU from and into the apparatus. Another configuration may be employed, for example, in which wheel 533g is attached to body-side lower guide 534 (i.e., apparatus body 2 side) and rotates to follow the movement of upper guide member 537 of the ADU.

[Additional Note]

The above described embodiment is capable of introducing technical ideas or configurations, such as the following (1) to (9).

(1) Image forming apparatus including:

image forming section 40 for forming a toner image on long sheet LS;

fixing section 60 for fixing the toner image formed on long sheet LS;

main conveyance path 530 for conveying long sheet LS to image forming section 40 and fixing section 60; and double-side conveyance path 533, which branches off from main conveyance path 530, downstream of fixing section 60 in the conveyance direction, and which is configured to convey long sheet LS upstream of image forming section 40 by reversing the conveyance direction of long sheet LS at switchback point SBP to invert long sheet LS, in which double-side conveyance path 533 includes, in the conveyance direction before the switching back of long sheet LS, curved conveyance path 533c which is curved to bend backward, and curved conveyance path 533c includes conveyance rollers 53c for conveying long sheet LS.

(2) In the configuration (1), curved conveyance path 533c is connected to main conveyance path 530 upstream of image forming section 40.

(3) In the configuration (1) or (2), wheel 53d is provided, which comes into contact with and rotates on the image formed-surface of long sheet LS conveyed to curved conveyance path 533c.

(4) In any one of the configurations (1) to (3), the distance from conveyance rollers 53c to switchback rollers 53b for reversing the conveyance direction of long sheet LS at switchback point SBP is shorter than the length of long sheet LS in the conveyance direction, and longer than the length of a standard-size sheet in the conveyance direction.

(5) In the configuration (4), conveyance rollers 53c conveys long sheet LS at a peripheral speed the same as that of switchback rollers 53b before the reversing of long sheet LS at switchback point SBP.

(6) In the configuration (4) or (5), conveyance rollers 53c is driven by a driving source different from that for switchback rollers 53b.

(7) In any one of the configurations (1) to (6), conveyance rollers 53c are separated from long sheet LS at the time of long sheet LS being switched back.

(8) In the configuration (3), wheel 53d is disposed on curved conveyance path 533c downstream of conveyance rollers 53c in the conveyance direction before the switching back.

(9) A method for controlling conveyance of a sheet, which is used in image forming apparatus 1 provided with double-side conveyance path 533 including, in the conveyance direction before reversing of long sheet LS at switchback point SBP, curved conveyance path 533c curved to bend backward, for forming images in image forming section 40 on both sides of long sheet LS having a length in the conveyance direction thereof longer than a predetermined length, in which:

in the case of forming toner images on the both sides of long sheet LS, conveyance rollers 53c disposed on curved conveyance path 533c is driven to convey long sheet LS before the reversing of long sheet LS at switchback point SBP.

Although embodiments of the present invention have been described and illustrated in detail, the disclosed embodiments are made for purpose of illustration and example only and not limitation. The scope of the present invention should be interpreted by terms of the appended claims.

What is claimed is:

1. An image forming apparatus comprising:

an image former for forming a toner image on a long sheet, an image fixer for fixing the toner image formed on the long sheet;

a main conveyance path for conveying the long sheet to the image former and the image fixer; and a double-side conveyance path which branches off from a first side, in the main conveyance path, downstream of the image fixer in a conveyance direction of the long sheet, the double-side conveyance path conveying the long sheet to a second side upstream of the image former by reversing the conveyance direction at a point of switching back to invert the long sheet, wherein:

the double-side conveyance path includes a merging pathway located at the second side upstream of the image former in the main conveyance path, and wherein:

the image forming apparatus includes a first introducer for introducing, into the merging pathway at a first merging point upstream of the image former, a head of the long sheet in the conveyance direction before the reversing of the conveyance direction at the point of switching back, the reversing of the conveyance direction causing merging of the long sheet with the main conveyance path at a second merging point located upstream of the image former and downstream of the first merging point.

2. The image forming apparatus according to claim 1, wherein:

the first introducer is a step-forming member which forms a step relative to a sheet guide of the merging pathway so that the sheet guide receives the head of the long sheet in the conveyance direction before the reversing of the conveyance direction at the point of switching back.

3. The image forming apparatus according to claim 2, wherein:

the step-forming member is fixed to an apparatus body.

4. The image forming apparatus according to claim 1, wherein:

a first sheet guide of a pair of sheet guides which form the double-side conveyance path is disposed on an unit movable from and into an apparatus body, and a second sheet guide of the pair of the sheet guides is fixed to the apparatus body; and a gap retainer for maintaining a gap between the pair of the sheet guides is provided between the pair of the sheet guides, the gap retainer being disposed on an end side which is on an outside of a width of the long sheet conveyed in the gap.

5. The image forming apparatus according to claim 4, wherein:

the gap retainer is a wheel which comes in contact with the second sheet guide while being axially supported by the first sheet guide, and which rotates in accordance with a movement of the movable unit from and into the apparatus body.

6. The image forming apparatus according to claim 4, wherein:

the gap retainer is disposed on the end side in the direction toward a front of the apparatus body.

7. The image forming apparatus according to claim 6, further comprising:

a second introducer for introducing into the main conveyance path the head of the long sheet in the conveyance direction before the reversing of the conveyance direction at the point of switching back.

8. The image forming apparatus according to claim 7, wherein:

the second introducer forms a step relative to an inner sheet guide of the merging pathway so as to receive the head of the long sheet in the conveyance direction before the reversing of the conveyance direction at the point of switching back.

9. The image forming apparatus according to claim 1, wherein:

the double-side conveyance path includes a curved conveyance path which is curved to bend backward in the conveyance direction and configured to bend the long sheet backward in the conveyance direction at the curved conveyance path, into the merging pathway, before the reversing of the conveyance direction at the point of switching back of the long sheet, wherein:

the curved conveyance path includes a conveyance roller for conveying the long sheet.

* * * * *